(12) United States Patent
Ohlendorf et al.

(10) Patent No.: US 11,665,561 B2
(45) Date of Patent: May 30, 2023

(54) TEST METHOD, DEVICE AND SYSTEM FOR CSI TYPE 2 CODEBOOK VERIFICATION OF A 5G COMPLIANT DEVICE UNDER TEST ("5G NR DUT") IN A SU-MIMO TEST SETUP

(71) Applicant: Rohde & Schwarz GmbH & Co. KG, Munich (DE)

(72) Inventors: Rainer Ohlendorf, Muensing (DE); Niels Petrovic, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/481,692

(22) Filed: Sep. 22, 2021

(65) Prior Publication Data

US 2022/0132339 A1 Apr. 28, 2022

Related U.S. Application Data

(60) Provisional application No. 63/104,254, filed on Oct. 22, 2020.

(51) Int. Cl.
*H04B 3/46* (2015.01)
*H04W 24/06* (2009.01)
*H04B 7/0417* (2017.01)
*H04L 25/02* (2006.01)
*H04B 17/391* (2015.01)
*H04B 7/0456* (2017.01)

(52) U.S. Cl.
CPC .......... *H04W 24/06* (2013.01); *H04B 7/0417* (2013.01); *H04B 7/0456* (2013.01); *H04B 17/3911* (2015.01); *H04L 25/0204* (2013.01)

(58) Field of Classification Search
CPC ... H04W 24/06; H04B 7/0417; H04B 7/0456; H04B 17/3911; H04B 17/17; H04B 7/0478; H04L 25/0204
USPC .......................................................... 375/224
See application file for complete search history.

(56) References Cited

U.S. PATENT DOCUMENTS

| | | | |
|---|---|---|---|
| 2014/0334391 A1* | 11/2014 | Khoshnevis | H04L 5/0057 370/329 |
| 2019/0081678 A1* | 3/2019 | Park | H04B 7/0626 |
| 2019/0109626 A1* | 4/2019 | Park | H04B 7/0626 |

FOREIGN PATENT DOCUMENTS

| | | |
|---|---|---|
| EP | 3 307 013 B1 | 9/2019 |
| WO | 2016163855 A1 | 10/2016 |

* cited by examiner

*Primary Examiner* — Helene E Tayong
(74) *Attorney, Agent, or Firm* — Ditthavong, Steiner & Mlotkowski

(57) ABSTRACT

A method and a test device for testing the CSI Type 2 channel estimation capability of a DUT are provided. The method includes: a) stimulating certain variance of PMI feedback values from the DUT, especially those belonging to the finer grained Type 2 CSI, b) a statistical collection of one or more PMI reports received through CSI reporting from the DUT during the test execution, c) an identification of Type 1/Type 2 PMI feedback type based on the CSI reports received from the DUT, and d) applying a pass criterion: a minimum threshold of Type 2 specific feedback reports must have been received.

9 Claims, 3 Drawing Sheets

TEST METHOD, DEVICE AND SYSTEM FOR CSI TYPE 2 CODEBOOK VERIFICATION OF A 5G COMPLIANT DEVICE UNDER TEST ("5G NR DUT") IN A SU-MIMO TEST SETUP

TECHNICAL FIELD

The present disclosure relates to a fixture for electrically connecting a measurement device with a device under test (DUT) and for mechanically holding the DUT. In particular, the present disclosure relates to a fixture for a wireless DUT.

The invention is in the area of verifying user equipment (UE) performance with CSI Type 2 feedback.

The 3GPP fifth-generation (5G) radio interface known as New Radio (NR) uses precoding to support multi-stream (a.k.a. multi-layer) transmission in multi-antenna communication. Precoding transforms the transmit symbols' vector such that the vector reaches the receiver in the strongest form that is possible in the given channel. A precoding matrix determines how the multiple streams are mapped to the multiple antennas. Skillfully selecting a precoding matrix from a codebook of available precoding matrices thus yields a maximum bit rate which the UE can receive across all layers.

Multi-stream transmission to a same receiver is referred to as Single User Multiple Input Multiple Output (SU-MIMO).

UEs may report Channel State Information (CSI) including a Precoding Matrix Indicator (PMI) to suggest a preferred precoding matrix uplink (UL) to the base station (gNB) in response to measurement of CSI reference signals (CSI-RS) sent downlink (DL) to the UE.

A CSI-Type 1 (or I) codebook is designed for SU-MIMO and based on predefined matrices selected by UE report and RRC configuration, similar to LTE. By contrast, a CSI-Type 2 (or II) codebook is designed mainly for MU-MIMO (Multi User MIMO) and based on a parameterized mathematical formula wherein the parameters are determined by UE report and RRC configuration.

A SU-MIMO test framework may be used for follow-PMI tests, where the DUT is configured to report back its preferred PMI from the CSI-Type 2 codebook to the test device ("test equipment").

The test method may be performed in two steps:

Step 1:
The test equipment uses a random PMI from the Type 2 codebook in its download (DL) signal generation to the UE (DUT) and measures the achievable DL throughput performance.

Step 2:
The test equipment uses the reported PMI from the DUT in its DL signal generation to the UE and measures the achievable DL throughput performance.

A performance threshold for throughput improvement between the steps 1 and 2 can be set, which the UE must demonstrate in order to pass the test.

As only a single DUT is driven the test setup can be modeled in a SU-MIMO test setup.

The CSI Type 1 codebook (which is specified to only provide SU-MIMO operation as mentioned before) is contained as a subset inside the CSI Type 2 codebook. Therefore, a UE may choose to implement only the Type 1 Codebook based channel estimation and then still feedback the resulting PMI values as part of CSI Type 2 reporting operation. Assuming a SU-MIMO test setup, it would enable UEs with a "poor" implementation to still pass the test criterion and the test is unable to differentiate UEs with capability for "real" Type 2 reporting.

ASPECTS OF THE INVENTION

The test objective can be achieved by combining two different measurements into the conformance test specification.

TEST/MEASUREMENT METHOD 1

Figure 1:
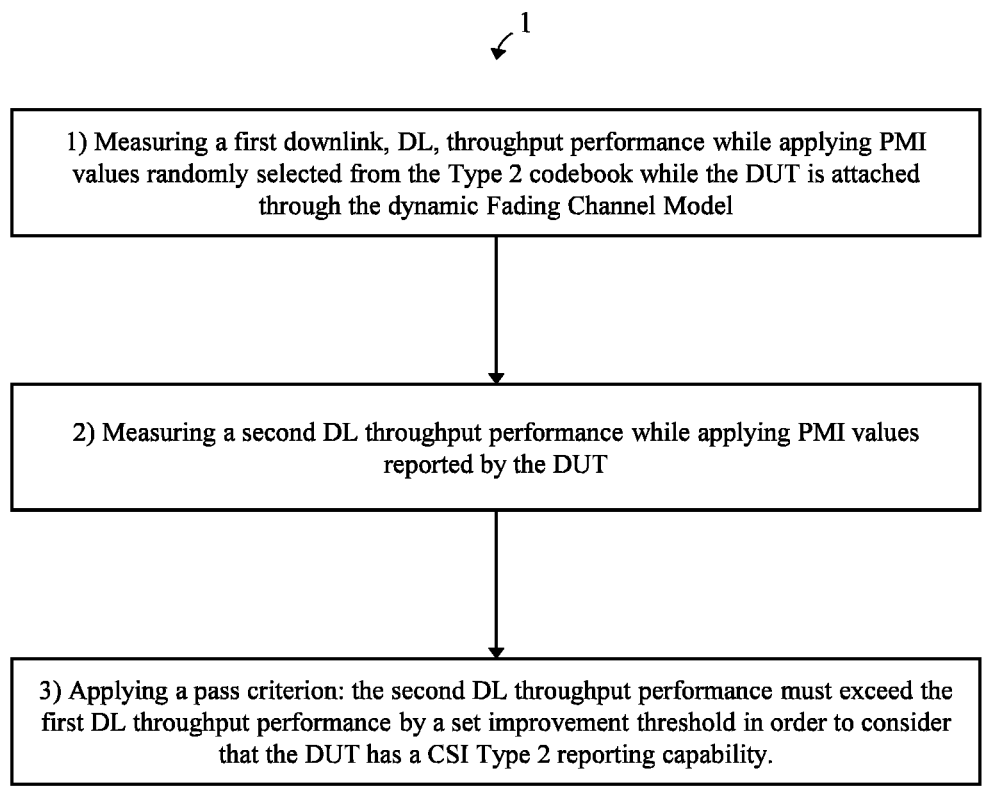
FIG. 1 illustrates a test/measurement method in accordance with prior art.

Validation of follow-PMI operation of the DUT using Type 2 PMI feedback, as illustrated in FIG. 1:

The DUT is configured for Type 2 CSI reporting and a SU-MIMO test procedure is applied.

In step 1 the baseline throughput performance is measured while applying random PMIs selected from the Type 2 codebook in downlink (DL) communication while the DUT is attached through a dynamic fading channel.

In step 2, the test equipment is using the PMI values reported by the DUT in its DL transmission chain and the throughput performance is measured again.

As in previous tests, by following the PMI guided by the UE reports, a better throughput performance is expected compared to the random PMI phase. A threshold value for the improvement can be set in order to consider that the DUT has successfully passed the test.

As mentioned in the problem setting, this solves only one part of the validation problem. By passing the measurement method 1, a DUT can be proven to have correctly implemented the Type 2 CSI reporting implementation and that it is able to perform the CSI measurement and reporting protocol. However, a DUT may still pass the test, if is uses only the Type 1 PMI subset and packs the (simpler) channel state estimate" into the CSI Type 2 protocol format.

Figure 2:
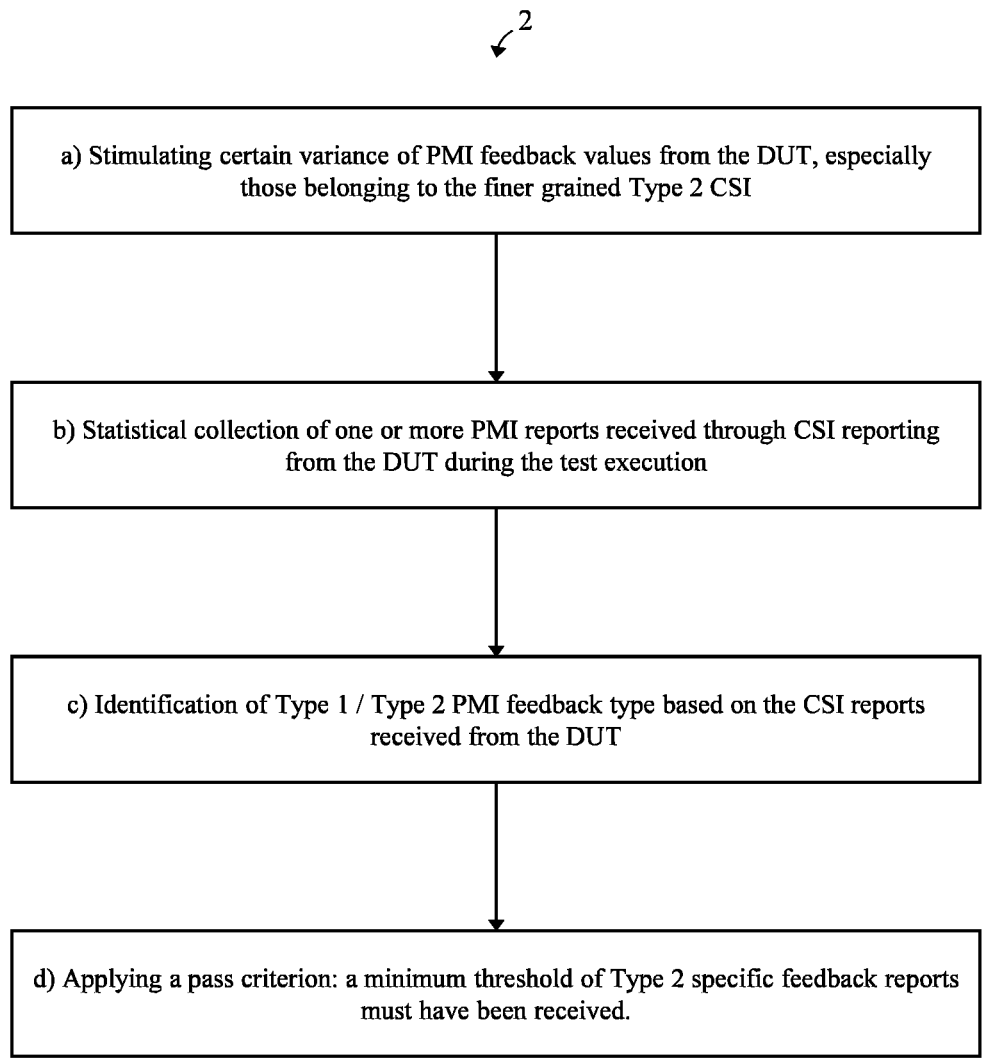
FIG. 2 illustrates a test/measurement method in accordance with the present disclosure.

Test/Measurement Method 2:

Thus there is a need for a validation that the DUT is actually capable of CSI Type 2 channel estimation. According to an aspect, this is achieved as follows:

In order to distinguish DUTs with Type 1 channel estimation from those implementing Type 2 channel estimation, a measurement method 2 is introduced, as illustrated in FIG. 2, which needs to be passed in addition to (and preferably after) said measurement method 1.

a) The DUT is driven in follow-PMI mode through the test equipment where either
  i) the normal Fading Channel or
  ii) a special deterministic channel model
is used to stimulate certain variance of PMI feedback values, especially those belonging to the finer grained Type 2 CSI.

b) The test equipment then performs a statistical analysis of the received CSI reports from the DUT and c) evaluates the feedback in its validation.

It is to be understood that the collection and evaluation of a single PMI report is comprised in the term "statistical analysis". Preferably a plurality of PMI reports are collected.

d) The test is only passed, if the fed back PMI values contain matrices which are with a given rate higher than a preset threshold percentage, preferably exclusively, covered by the Type 2 feedback and are not possible to be signaled by the Type 1 feedback.

According to an embodiment, the DUT is considered to successfully pass the certification/validation for CSI Type 2 performance, if it passes consecutively the two measurements methods 1 and 2 as outlined above.

In an aspect, the measurement method 2 comprises the following aspects:

The test equipment (device) is designed for:

a) stimulating certain variance of PMI feedback values from the DUT, especially those belonging to the finer grained Type 2 CSI, b) a statistical collection of one or preferably more PMI reports received through CSI reporting from the DUT during the test execution, c) an identification of Type 1/Type 2 PMI feedback type based on the CSI reports received from the DUT, d) applying a pass criterion: a minimum threshold of Type 2 specific feedback reports must have been received. A single PMI report may be significant for applying the pass criterion.

The test equipment may define a propagation model (channel model), which is able to stimulate specifically the transmission of one or more Type 2 CSI reports (compared to using the established Fading Channel Models).

Such a special Channel Model may not reflect the actual channel condition modeled from real-world operation, but would help recognize Type 2 implementation in a faster/more efficient/reproducible fashion in comparison to statistical channels without predictable outcome.

SU-MIMO PMI validation test methods can be used, and by introducing additional signaling messages (restriction of the PMI values to be used) it can be insured that only UEs with a proper "full" CSI Type 2 codebook implementation pass the test.

The test complexity of the setup is kept to a minimum, so cost-effective validation of the test purpose can be achieved.

Figure 3:
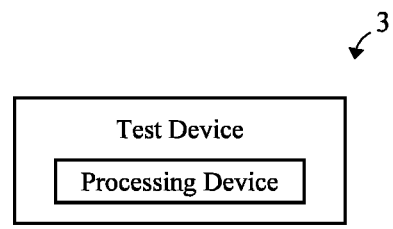
FIG. 3 illustrates a test device in accordance with the present disclosure.

Thus, a test device 3 is proposed as outlined above, implementing optionally measurement method 1 of FIG. 1 and measurement method 2 of FIG. 2. To this end, the test device 3 may comprise a processing device, as illustrated in FIG. 3.

Figure 4:
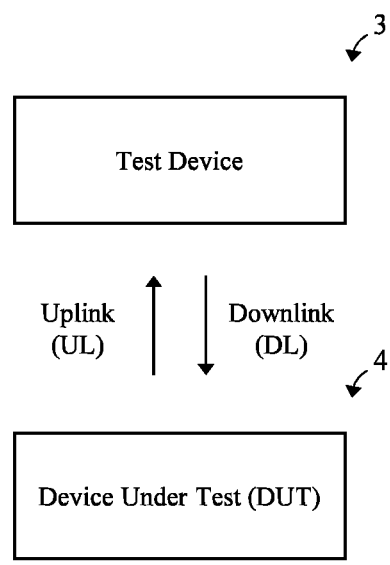
FIG. 4 illustrates a test kit in accordance with the present disclosure.

Further, a test kit 3, 4 is proposed as illustrated in FIG. 4, comprising such test device 3 as well as a DUT 4.

Still further, a test method is proposed comprising optionally the measurement method 1 and the measurement method 2.

What is claimed is:

1. A method for testing a Channel State Information (CSI) Type 2 channel estimation capability of a Device Under Test (DUT), the method comprising the following steps:
   a) stimulating certain variance of Precoded Matrix Index (PMI) feedback values from the DUT, especially those belonging to a finer grained Type 2 CSI,
   b) performing a statistical collection of one or more PMI reports received through CSI reporting from the DUT during the test execution,
   c) making an identification of Type 1 or Type 2 PMI feedback type based on the CSI reports received from the DUT, and
   d) applying a pass criterion: a minimum threshold of Type 2 specific feedback reports must have been received.

2. The method of claim 1, wherein a propagation model or channel model is defined, which is able to stimulate specifically the transmission of one or more Type 2 CSI reports when compared to using an established Fading Channel Model.

3. The method of claim 2, which is a Single User Multiple-Input Multiple Output (SU-MIMO) PMI validation test method.

4. The method of claim 3, further comprising: measuring a first downlink, DL, throughput performance while applying PMI values randomly selected from the Type 2 codebook while the DUT is attached through the established Fading Channel Model, measuring a second DL throughput performance while applying PMI values reported by the DUT, and applying a pass criterion: the second DL throughput performance must exceed the first DL throughput performance by a set improvement threshold in order to consider that the DUT has a CSI Type 2 reporting capability.

5. A test device for testing a Channel State Information (CSI) Type 2 channel estimation capability of a Device Under Test (DUT), the test device being designed to:
   a) stimulate a variance of Precoded Matrix Index (PMI) feedback values from the DUT, especially those belonging to a finer grained Type 2 CSI,
   b) perform a statistical collection of one or more PMI reports received through CSI reporting from the DUT during the test execution,
   c) identify Type 1 or Type 2 PMI feedback type based on the CSI reports received from the DUT, and
   d) apply a pass criterion: a minimum threshold of Type 2 specific feedback reports must have been received.

6. The test device of claim 5, which is designed to define a propagation model or channel model stimulating specifically the transmission of one or more Type 2 CSI reports when compared to using an established Fading Channel Model.

7. The test device of claim 6, which is a Single User Multiple-Input Multiple Output (SU-MIMO) PMI validation test device.

8. The test device of claim 7, further being designed to:
   measure a first downlink, DL, throughput performance while applying PMI values randomly selected from the Type 2 codebook while the DUT is attached through the established Fading Channel Model,
   measure a second DL throughput performance while applying PMI values reported by the DUT, and
   apply a pass criterion: the second DL throughput performance must exceed the first DL throughput performance by a set improvement threshold in order to consider that the DUT has a CSI Type 2 reporting capability.

9. A kit comprising the test device of claim 5 and the DUT.

* * * * *